United States Patent [19]

Smyth

[11] 3,718,614

[45] Feb. 27, 1973

[54] POLYMERIC VISCOSITY CONTROL ADDITIVES FOR SILICA THIXOTROPIC COMPOSITIONS

[75] Inventor: Nelda Marjorie Smyth, Stamford, Conn.

[73] Assignee: American Cyanamid Company, Stamford, Conn.

[22] Filed: Feb. 23, 1971

[21] Appl. No.: 118,165

[52] U.S. Cl...............260/31.8 R, 106/181, 106/189, 106/193 J, 260/33.4 R, 260/37 AL, 260/41 A

[51] Int. Cl...........................C08f 45/40, C08f 45/34

[58] Field of Search........ 260/41 A, 91.1 R, 91.1 M, 31.8 R

[56] References Cited

UNITED STATES PATENTS

| | | | |
|---|---|---|---|
| 3,285,896 | 11/1966 | MacKenzie | 260/91.1 |
| 3,058,957 | 10/1962 | Breslow | 260/91.1 |
| 2,876,133 | 3/1959 | Iler | 260/41 A |
| 2,697,084 | 12/1954 | Eger | 260/41 A |
| 3,519,593 | 7/1970 | Bolger | 260/41.5 A |

*Primary Examiner*—Morris Liebman
*Assistant Examiner*—P. R. Michl
*Attorney*—Robert P. Raymond

[57] ABSTRACT

Novel thixotropic compositions and processes for their formation employing as viscosity control additives therein members selected from the group consisting of: 1) homopolymers and copolymers of poly(alkylene oxides) having terminal alkyl groups; 2) homopolymers and copolymers of poly(vinyl alkyl esters) and poly(vinyl alkyl ethers) with the optional inclusion of minor amounts of alkylenes and styrenes in said copolymers; 3) 1:1 alternating copolymers of maleic anhydride with alkylenes and styrenes; 4) cellulose esters and mixed cellulose esters of 2-, 3- and 4-carbon acids and mixtures of said esters with the poly(alkylene oxides).

1 Claim, No Drawings

POLYMERIC VISCOSITY CONTROL ADDITIVES FOR SILICA THIXOTROPIC COMPOSITIONS

The invention herein described was made in the course of or under a contract or subcontract thereunder with The Department of the Navy.

The present invention relates to novel thixotropic compositions and to processes for their production. More particularly, it relates to compositions containing silica and certain polymeric substances as viscosity control additives.

It is well known in the art to convert free-flowing liquids into thixotropic compositions by the addition of silica. Such compositions have found wide utility in the manufacture of dripless surface coatings, non-sagging sealants, adhesives, non-setting suspensions and the like. It is believed that macroscopic viscosity in the liquid systems are established by the formation of three dimensional networks of silica chains which entrap and retard the flow of the liquid.

Lower molecular weight additives having multiple hydrogen bonding sites are typically employed with finely divided silica to improve its thickening and thixotropic effects. These substances are known as viscosity control additives. Conventional additives include water and organic liquids containing hydrogen atoms which are capable of forming hydrogen bonds with the oxygen atoms in the silica. Diamines and dihydroxy compounds are typical of such additives.

The formation of thixotropic compositions containing components which are sensitive to or reactive with conventional hydrogen bonding viscosity control additives has presented problems long standing in the art. Accordingly, it is an object of the present invention to provide novel compositions employing viscosity control additives which substantially overcome the above problems. Further objects and advantages will be apparent from the following description and examples.

It has been unexpectedly discovered that certain polymeric substances can be advantageously employed as viscosity control additives in lieu of conventional viscosity control agents, in the preparation of silica-containing thixotropic compositions. They provide the advantage of permitting the form a formation of thixotropic compositions containing ingredients sensitive to many of the conventional additives.

The polymeric substances are selected from the group consisting of 1) homopolymers and copolymers of poly(alkylene oxides) having terminal alkyl groups; 2) homopolymers and copolymers of poly(vinyl alkyl esters) and poly(vinyl alkyl ethers) with the optional inclusion of minor amounts of alkylenes and styrenes in said copolymers; 3) 1:1 alternating copolymers of maleic anhydride with alkylenes and styrenes; 4) cellulose esters and mixed cellulose esters of 2-, 3- and 4-carbon acids and mixtures of said esters with the poly(alkylene oxides).

It is preferred to employ polymers having an average molecular weight in the range of from about $1.0 \times 10^3$ to about $5 \times 10^6$. These are available from a variety of commercial sources and can be prepared by conventional procedures as described in the polymer literature; see, for example, Polymer Handbook, J. Brandrup et al., Interscience Publishers, N.Y. (1966), and references cited therein.

Suitable polyalkylene oxides can be prepared by polymerizing one or more olefin oxides of the following formula:

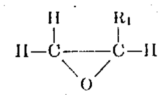

wherein $R_1$ is the same or different lower alkyl groups from $C_1$ to $C_4$, such as, methyl, ethyl, n-propyl, i-propyl, n-butyl, t-butyl; or phenyl groups. Suitable compounds include, for example, poly(ethylene oxide), poly(propylene oxide), poly(hexylene oxide), poly(ethylene oxide co-propylene oxide), and the like.

Suitable poly(vinyl alkyl esters) can be prepared by polymerizing one or more compounds of the following formula:

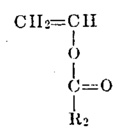

wherein $R_2$ is the same or different lower alkyl groups from $C_1$ to $C_3$, such as: methyl, ethyl, n-propyl and isopropyl. Suitable polymers of this class include, for example, poly(vinyl acetate), poly(vinyl propionate), poly(vinyl butyrate), poly(vinyl acetate-co-vinyl propionate) and the like.

Suitable poly(vinyl alkyl ethers) can be prepared by polymerizing one or more compounds of the formula:

$$CH_2=CH-O-R_3$$

wherein $R_3$ is the same or different alkyl groups from $C_1$ to $C_{18}$, such as, methyl, ethyl, n-propyl, n-butyl, t-butyl, n-pentyl, n-hexyl, n-heptyl, n-octyl, n-nonyl, n-decyl, n-octadecyl and the like. Suitable polymers include, for example, poly(vinyl methyl ether), poly(vinyl ethyl ether), poly(vinyl isopropyl ether), poly(vinyl octadecyl ether), poly(vinyl methyl ether-covinyl ethyl ether) and the like.

Illustrative of alkylenes suitably employed in preparing the copolymers are 1-alkylenes from $C_2$ to $C_8$. Suitable monomers include ethylene, propylene, 1-butylene, 1-octylene and the like.

The alkylene and styrene containing copolymers may be prepared by employing minor amounts, namely, less than 50 percent on a mole basis, of one or more of these monomers, such as, ethylene, styrene, Δ-methyl styrene and the like with one or more of the vinyl alkyl esters or vinyl alkyl ethers. 1:1 Alternating copolymers are employed in the case of maleic anhydride. The other copolymers can be in various configurations, such as, random, block, graft copolymers and the like. Suitable copolymers include, for example, poly(vinyl methyl ether-co-maleic anhydride), poly(styrene-co-maleic anhydride), poly(ethylene-co-vinyl acetate), poly(ethylene-Δ-vinyl butyrate), poly(ethylene-co-vinyl ethyl ether) and the like.

The cellulose esters are mixed esters used in the present invention and the esterification products corresponding to the condensation products of carboxylic acids in the C—2 to C—6 range with the hydroxyl groups of the cellulose chain.

Suitable esters include, for example, cellulose acetate, cellulose propionate, cellulose butyrate, cellulose acetate butyrate, cellulose hexanoate and the like. The esters can be prepared by a variety of conventional procedures and a variety are readily available from various commercial sources. Suitable esters can be widely varied with regard to ester content and viscosity. Preferred esters have a carboxyl weight percent in the range of from about 35 to about 60 and a viscosity in the range of from about 1.1 poises to about 200 poises. Half Second Butyrate by Eastman Kodak Co. having 37 wt. percent butyryl content and 13 wt. percent acetyl content and a viscosity of 1.12 to 1.88 poises as determined by ASTM method D-1343-54T in solution A of D-871-4T is preferred.

Greaselike materials having no spontaneous flow and high cohesive and adhesive properties to a variety of surfaces are prepared by employing mixtures of the previously mentioned poly(alkylene oxides) with the above cellulose esters. Preferred mixtures are blends of the above Half-Second Butyrate and poly(ethylene oxides), Polyox WSRN-80 or WSR-205 by Union Carbide Corp. having average molecular weights of about 200,000 and 600,000 respectively. Preferred mixtures employ about 2 parts by weight of ester per part of oxide.

The silica employed in the preparation of the compositions of the present invention is of the type conventionally used in the preparation of thixotropic compositions. It is commercially available from a variety of sources, such as, the fumed silica sold under the tradename Cab-O-Sil sold by the Cabot Corporation.

The relative amount of a particular type of silica required to obtain a thixotropic system will depend upon the solvent system and the polymer employed as a viscosity control additive together with the rheological properties desired in the final composition.

Generally, from about 3 parts to about 7 parts of silica are suitable to impart thixotropy to about 100 parts of a solvent composition. The desired degree of viscosity control is generally achieved by the addition of one or more of the above polymers in a total quantity of from about 1 part to about 10 parts per 100 parts of the silica-containing solvent composition.

The desired thixotropic compositions can be prepared merely by mixing the above ingredients; however, it is preferred to initially prepare a suspension of the silica with a polar solvent which will constitute a portion of the total solvent in the final thixotropic mixture. Such a suspension is achieved by adding the silica to the solvent while it is being subjected to high shear stirring, such as may be achieved in a Waring blender equipped with a propeller blade. The fluid suspension produced can then be combined with the other ingredients with more moderate stirring to produce a homogeneous thixotropic composition. Dibutyl phthalate is a convenient solvent for preparing the above suspensions. In general, any solvent of liquid which is compatible with the fluid in which the thixotropic properties are to be established is suitable for use in preparing the suspension.

The present invention is further illustrated by the following examples which are not to be taken as limitative thereof. Unless otherwise indicated, all parts are by weight.

EXAMPLE 1

A Two Component System with Poly(vinyl ethyl ether) As Viscosity Control Agent A polymeric viscosity control component was prepared by dissolving 4.0 parts of medium molecular weight ($3 \times 10^5$ to $7 \times 10^5$ MW) poly(vinyl ethyl ether) sold by the Monsanto Chemical Company under the trademark EDBM in 84.2 parts of dibutyl phthalate. Solution was facilitated by stirring the ingredients at a shear rate of about 150 revolutions per second. The resulting composition had a viscosity of about 8.0 poises, measured with a Ferranti Cone and Plate Viscometer, using a medium cone at a temperature of 24.5° C.

A thixotrope component was prepared by mixing 50.2 parts of dibutyl phthalate with 37.3 parts of 3-methyl-3-pentanol. 12.5 Parts of fumed silica, M-5 grade Cab-O-Sil by Cabot Corporation were then slowly added to produce a silica suspension with the assistance of high shear stirring in a Waring blender. While this component becomes thixotropic under prolonged non-stress conditions (6.4 poises at a shear rate of 20 sec. $^{-1}$ and 7.2 poises at a shear rate of 600 sec. $^{-1}$), it can be readily fluidized by mixing to produce, for example, a viscosity at 600 sec. $^{-1}$ of 1.2 poises.

A thixotropic composition with polymeric viscosity control is prepared from the above components by combining them with mixing. For example, such composition was prepared by mixing about 1.22 parts by volume of the thixotrope component with about 1.00 parts by volume of the component containing the viscosity control agent. The viscosity of the mixture at 20 sec. $^{-1}$ shear rate is greater than 2,000 poises, the upper limit of the Ferranti Cone and Plate Viscometer employed.

For purposes of comparison, the thixotropic composition is prepared as above omitting therefrom the poly(vinyl ethyl ether). The resulting composition has a viscosity which is too low to be measured by the Ferranti Cone and Plate Viscometer.

EXAMPLE 2

4.36 Parts by volume of a 5 percent solution of poly(vinyl ethyl ether) having a high (about $7 \times 10^5$) molecular weight dissolved in dibutyl phthalate was mixed with high shear stirring with 4.36 parts by volume of fumed silica and 1 part by volume of 3-methyl-3-pentanol.

The viscosity of the resulting composition was determined by means of a Ferranti Cone and Plate Viscometer with was equipped with a medium cone and operated at a temperature of about 24.5° C. At the shear rate of 20 revolutions per second the viscosity in poises was in excess of 2,000.

EXAMPLE 3

4.36 Parts by volume of 5 percent solution of poly(vinyl acetate) having an average molecular weight of about 2 × $10^6$ and produced by American Hoechst under the trademark Mowilith 90 dissolved in dibutyl phthalate was mixed with moderate stirring with 4.36 parts by volume of the thixotrope component as in Example 1 by 1 part by volume of 3-methyl-3-pentanol.

The viscosity of the resulting composition was determined by means of a Ferranti Cone and Plate Viscometer, which was equipped with a medium cone and operated at a temperature of about 24.5° C. At a shear rate of 20 revolutions per second the viscosity in poises was in excess of 2,000.

EXAMPLE 4

A thixotropic mixture was obtained by mixing 100 grams of a 8.7 weight per cent solution of Sinclair Chemical's Resin 4000A, a low molecular weight (1 × $10^4$ = 3 × $10^5$) styrenemaleic anhydride copolymer, in dibutyl phthalate with 130 grams of a fluid silica suspension which composition in weight percent is 45% dibutyl phthalate, 32.4% dimethyl phthalate, 15.2% t-butyl alcohol and 7.4% Cab-O-Sil. The resulting weight percent concentrations of the copolymer and silica are 3.78% and 3.22%, respectively.

EXAMPLE 5

A thixotropic mixture is obtained by stirring together 100 parts by weight of a 92.5 weight percent dibutyl phthalate- 7.5 weight percent poly(ethylene oxide) solution with 100 parts by weight of a fluid silica suspension having a weight composition of 9.2% Cab-O-Sil, 26.6% 3-methyl-3-pentanol, 14.2% dibutyl phthalate, 43.0% dimethyl phthalate, and 7.0% t-butyl alcohol. The concentrations of the viscosity control additive, poly(ethylene oxide) and the silica in the final mixture are 3.8% and 4.6%, respectively.

EXAMPLE 6

Three 10 gram portions of a high viscosity base formulation (paste with no flow at 20° C., but some at 26° C.) composed of titanium dioxide (17.0 weight percent), medium oil alkyd resin (22.8%), mineral spirits (35.4%), xylene (11.1%), Cab-O-Sil M-5 Grade (9.9%), cobalt naphthenate (0.2%), and calcium naphthenate (0.2%) were diluted as follows:

1. with two grams of xylene, which gave a very fluid mixture composed of 44.3% solids and 55.3% solvent. The resulting composition was a non-thixotropic fluid.
2. with two grams of a mixture containing 5 grams poly(vinyl ethyl ether) EDBM, medium molecular weight (3 × $10^5$ – 7 × $10^5$) per 100 ml. of xylene. The resulting composition was a slow flowing mixture of 45.1% solids and 54.5% solvents.
3. with two grams of the polymer solution used in 2) above and 0.5 gram of xylene. The mixture, which was 43.3% solids and 56.4% solvents, was slightly less viscous than the composition of (2) above and considerably more viscous than (1) above which had a higher solids concentration.

One or more other fluid compositions composed of solvents, liquids, solutions and the like may be rendered thixotropic by the method described in this example and the written description hereinabove. In general, any organic solvent in which the polymeric composition exhibits solubility and which is compatible with the other ingredients employed can be used to form a component or a thixotropic composition of the present invention.

I claim:

1. A process for the formation of a silica containing thixotropic composition having a viscosity control additive therein of poly(vinyl ethyl ether) wherein said polymers have an average molecular weight in the range of from about 1.0 × $10^3$ to about 5.0 × $10^6$ comprising of steps of:

a. suspending silica in a solvent of dibutyl phthalate, 3-methyl-3-pentanol or mixtures thereof with high shear stirring;

b. forming a polymeric viscosity control composition by dissolving about 1 to about 20 parts by volume of viscosity control additive in the solvent; and c. combining the thixotrope component and the viscosity control additive with the organic liquid to be contained and mixing to form a thixotropic composition.

* * * * *